United States Patent [19]
Gelardi et al.

[11] Patent Number: 5,568,898
[45] Date of Patent: Oct. 29, 1996

[54] WRAP AROUND LABEL

[75] Inventors: Paul J. Gelardi; John A. Gelardi; David A. Capotosto, all of Cape Porpoise, Me.

[73] Assignee: LCV Associates, Kennebunkport, Me.

[21] Appl. No.: 478,833

[22] Filed: Jun. 7, 1995

Related U.S. Application Data

[62] Division of Ser. No. 145,318, Nov. 3, 1993.

[51] Int. Cl.$^6$ ................................................. G11B 23/087
[52] U.S. Cl. ............................................................ 242/344
[58] Field of Search .................................... 242/344, 347, 242/389, 391; 206/389, 391; 360/132

[56] References Cited

U.S. PATENT DOCUMENTS

| | | | |
|---|---|---|---|
| 3,565,367 | 2/1971 | Yamamoto | 242/345.3 |
| 4,501,359 | 2/1985 | Yoshizawa | 206/387 |
| 4,773,614 | 9/1988 | Makino et al. | 242/347 |
| 4,978,009 | 12/1990 | Pany | 206/387 |
| 5,103,978 | 4/1992 | Secor | 206/387 |
| 5,199,662 | 4/1993 | Klupt | 242/347 |
| 5,311,388 | 5/1994 | McLaren | 242/347 |

FOREIGN PATENT DOCUMENTS

| | | | |
|---|---|---|---|
| 2065757 | 9/1975 | Germany | 242/344 |
| 2559763 | 11/1977 | Germany | 242/344 |
| 1224737 | 3/1971 | United Kingdom | 206/387 |
| WO90/15001 | 12/1990 | WIPO | 206/387 |

*Primary Examiner*—John P. Darling
*Attorney, Agent, or Firm*—James Creighton Wray

[57] ABSTRACT

A video cassette is labeled with a wrap around label attached to the cover, to the back and to the bottom of the video cassette. The label has perforations for detachment of the bottom section. A clear film can be attached peripherally around an opening in the label for viewing a reel and hub within the video cassette. Portions of the cassette are molded as openings between the interior and exterior to reduce material costs, and are subsequently covered with the wrap around label. The invention is a lower cost molded video cassette with increased display area and removable label section, which can be put to various uses, such as an information card for future reference.

7 Claims, 5 Drawing Sheets

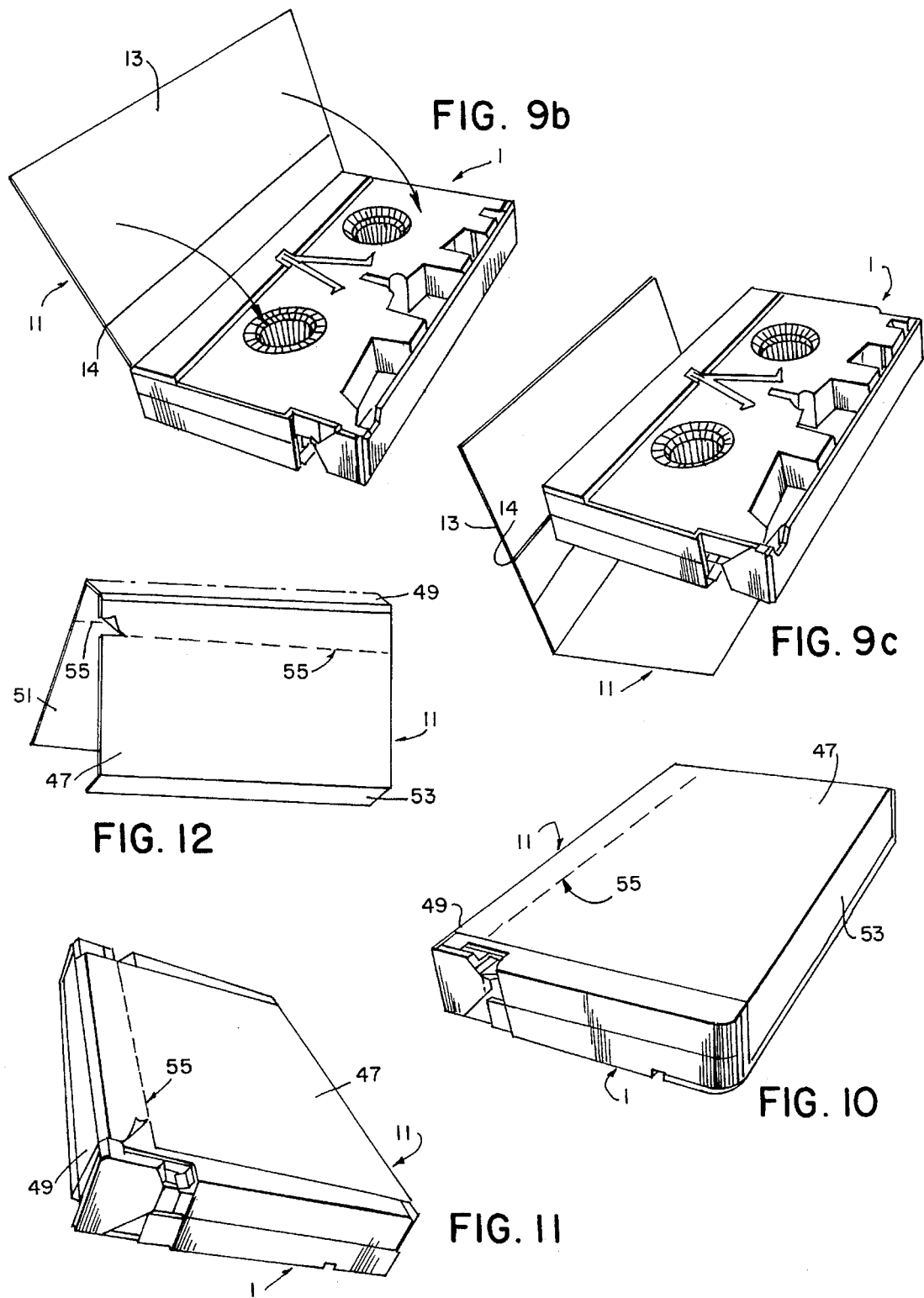

WRAP AROUND LABEL

This application is a division of application Ser. No. 08/145,318 filed Nov. 3, 1993.

BACKGROUND OF THE INVENTION

Video cassette containers have covers with rigid transparent windows for viewing tapes and reels, and bases with openings for engaging reel hubs and backs with an opening for admitting a sensor to prevent recording. Conventional video cassette containers are labeled with 2"×3" adhesive back labels which are adhered to rectangular depressions between the windows in the cover, and with back labels which are received within elongated depressions in the back. The label areas are small and present limited opportunities for graphic presentations on the outer surfaces of the video cassettes, which are also referred to as video cassette containers.

A need exists for a new labeling system which will provide larger areas for graphics.

There now exist low cost video cassettes used for promotional activities such as mailings and giveaways. These must be made inexpensively, yet they must be effective in transmitting their message. A primary component of the cost of these video cassettes is the plastic from which they are made.

A need exists for reducing material costs of low cost video tapes, while providing increased message display areas for better product promotion.

There also exists a need for a video cassette which can be safely mailed and handled, without damaging the movable dust doors and exposable tapes, and which is a self-container, promotional device that is tamper-evident.

SUMMARY OF THE INVENTION

The present invention provides an improved low cost video cassette, which combines decreased raw materials cost with increased graphics areas for increased promotional benefits.

A video tape incorporates a molded shell structure having molded holes or openings for communicating with the interior. The preferred video cassette of the invention incorporates a large, wrap-around label, which covers all openings and secures the dust door to prevent damages to the tape and to bar dust and dirt from entering the cassette through the openings in the shell. The label is permanently adhered to the shell, and is adequately attached to prevent damage or contamination of the contents.

Preferably the label has a full rectangular shape which covers the shell's top, dust door, base and spine. Preferably, the label has graphics along its surface. A section covering the dust door and reel drive sensor light and brake release openings in the base tears off for cassette operation. In a preferred embodiment, the removable section is an information card with telephone numbers and addresses, a Rolodex insert, or an instruction sheet printed on both sides, or a premium coupon.

The label also can have evacuated portions which correspond to reel hubs on the bottom of the shell. One embodiment incorporates clear, "spaghetti-window" portions covering openings in the shell for viewing the tape on one or both reels.

A preferred video cassette has a label wrapped around the dust cover, the top, the back and the bottom of the video cassette. The label has parallel perforations extending across the top and bottom for removing roughly half of the label to expose the dust cover and the front portion of the bottom. An alternate label has spaced openings on the bottom portion for providing access to the reel hubs, and has openings elsewhere on the shell for providing access to the tape and controls. The label can have a clear film attached peripherally around an opening in the label for viewing a reel and hub within the video cassette container.

In a preferred label attachment means, the label is adhered to the surface of the shell. In the case of the tear-off bottom section, only a few points of adherence would be necessary to hold the section on yet allow for removal. In another embodiment, label graphics card has edges held within recesses in the cover, back and bottom. Retainers which border edges of the recesses hold the graphics label card on the video cassette container.

A preferred wrap around label for a video cassette has three sides, an upper side, a lower side and a back portion, which interconnects the upper and lower sides in a continuous integrally formed graphics label.

In one embodiment, guides are formed in upper and lower and back surfaces of the video cassette for receiving the wrap around graphics label.

In a preferred embodiment, edge guides are formed in the upper and lower surfaces of video cassette for receiving edges of the graphics card.

Preferably upper and lower surfaces of the video cassette container and a rear surface are evacuated and covered by the video cassette graphics card.

In preferred embodiments, cutouts are formed in the graphics card, and transparent films having peripheral portions are bonded to areas of the graphics card surrounding the cutouts for viewing reels and tapes within the video cassette container.

Preferred labels provide first and second cutouts, and first and second films having peripheral areas are bonded to first and second areas of the card surrounding the cutouts for viewing reels and tapes through the films.

One wrap around label covers central longitudinal portions of the front, back and bottom surfaces.

A preferred label has first and second openings in the bottom portion of the wrap around label for aligning with reel hubs for providing access to the hubs through the label.

These and further and other objects and features of the invention are apparent in the disclosure, which includes the above and ongoing written specification, with the claims and the drawings.

BRIEF DESCRIPTION OF THE DRAWINGS

FIGS. 9a, 9b and 9c show views of the attached bottom section, and means of assembly, with the perforations between the rear and bottoms sections.

FIGS. 10 and 11 are perspective views of a preferred form of the invention, wherein the label encloses the dust door of the cassette and is removable by peeling at perforations.

FIG. 12 shows the unattached label of the embodiment in FIGS. 10 and 11.

DETAILED DESCRIPTION OF THE DRAWINGS

Figure 1:
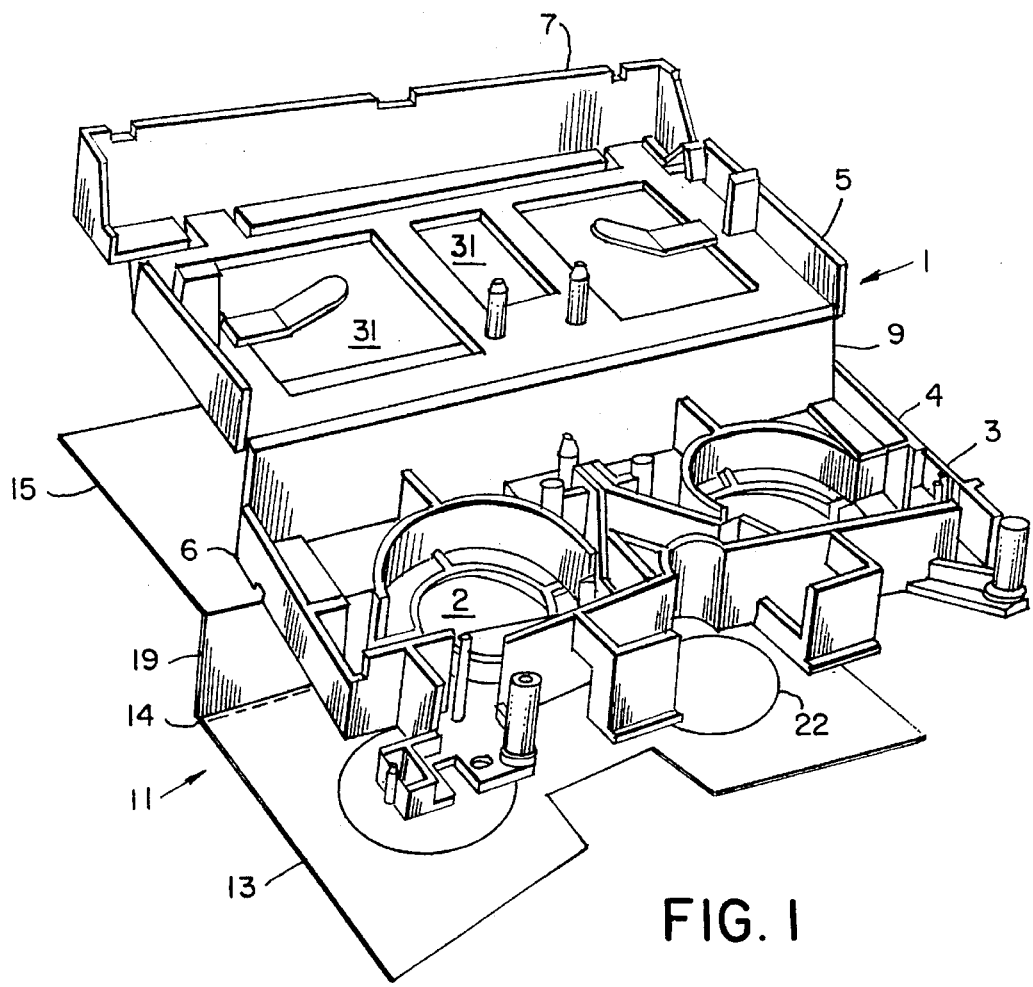
FIG. 1 is an elevated view showing the molded, low cost video cassette with openings and wrap around label.
Figure 3:
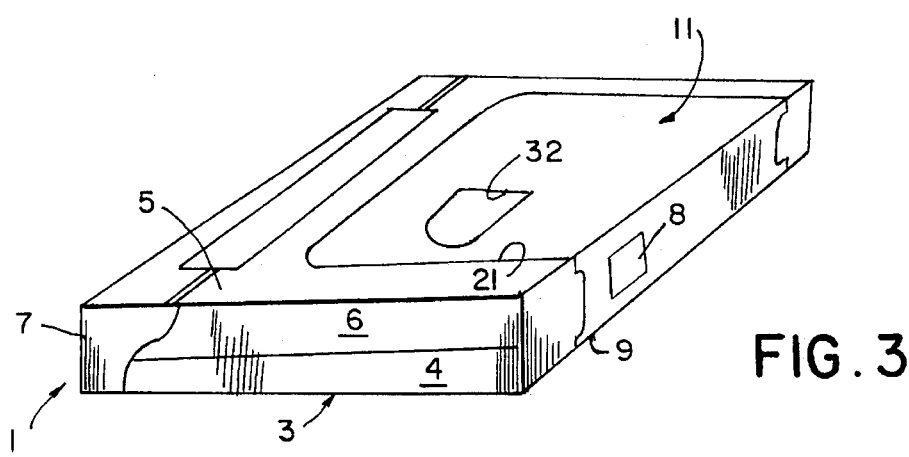
FIG. 3 is a perspective view of a video cassette having the wrap around label of the present invention.

Referring to the drawings, a preferred form of the invention is shown with reference to FIG. 1. A video cassette 1 has a base 3 and a cover 5, each integrally formed with partial side wall portions 4 and 6. A dust cover 7 is hinged to front parts of the side wall portion 6, and a back 9 completes the box. The base 3 has openings 2, which provide access to reel hubs for driving the tape within the cassette. In FIG. 3, the back 9 has an opening 8 which allows insertion of a sensor to prevent recording on prerecorded tape.

Figure 2:
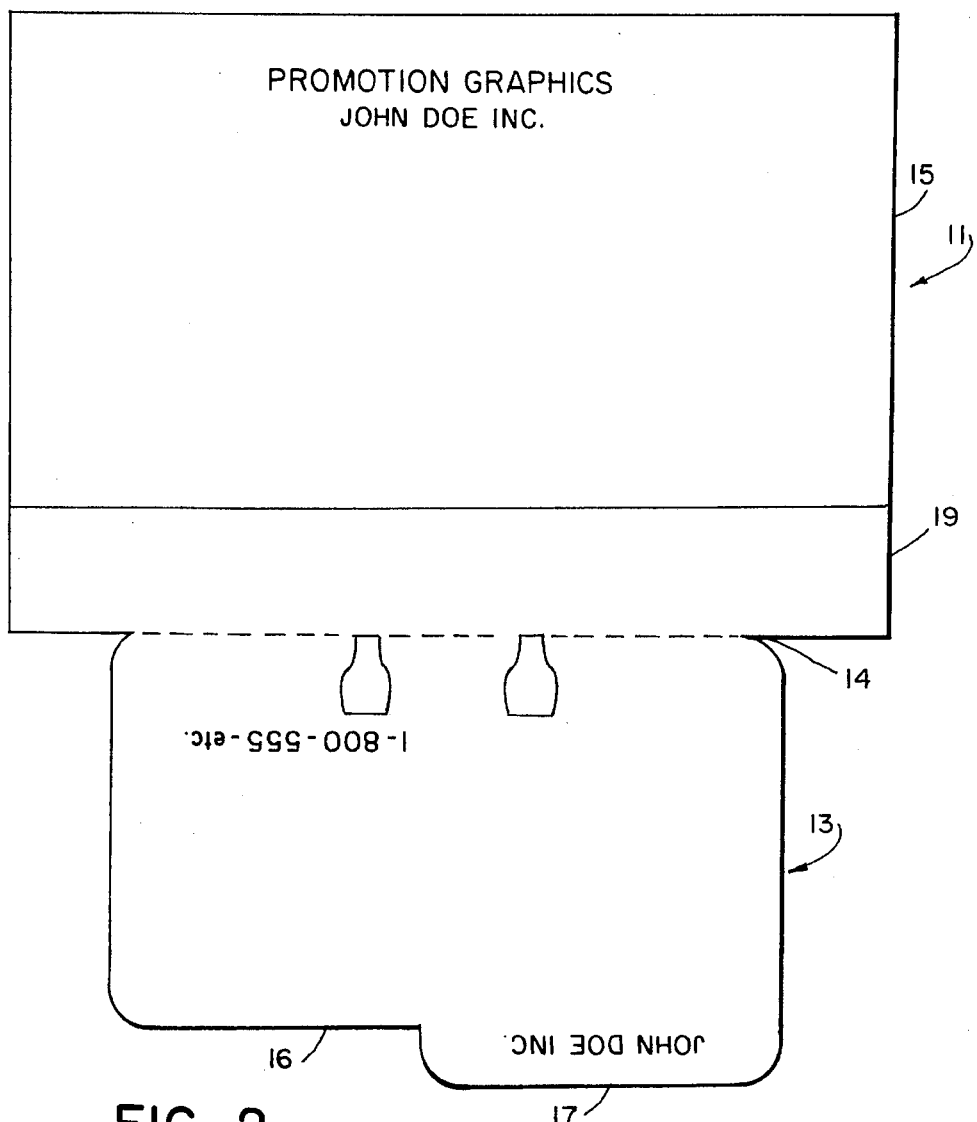
FIG. 2 is a plan view of a preferred label with a tear away bottom portion in the form of a index card.

A preferred form of the present invention is shown in FIGS. 1 and 2. A graphics card 11 has a lower portion 13, an upper portion 15 and a rear (or back) portion 19. The card's sections adhere to the corresponding portions of the cassette, wherein the lower section 13 attaches to the base 3, the back section 19 to the back 9, and the upper section to the cover 5. The graphics card incorporates perforations 14 along a hinged edge between the back 19 and the bottom 13 for removal of the bottom section by the user. The bottom 13 may have openings 22, allowing communication between a video cassette player and the cassette hub openings 2.

The preferred video cassette has evacuated portions or windows 31 molded into the cover 3 or other suitable section of the cassette. Those windows reduce the amount of plastic needed to construct the cassette, and lower overall costs so that a large volume of the cassettes may be distributed at a lower cost. In FIG. 1, the upper card portion 15 adheres to the cover 5 and covers the windows 31, thereby sealing the case from contaminants. Thus, the card replaces sections of the cassette, substituting paper (a typical construction material for the card) for plastic. The upper section of the label incorporates clear sections for viewing the interior. The clear sections can be plastic film adhered to edges of the label window in the upper section.

FIG. 2 shows an alternative embodiment for the card 11. The bottom section 13 can be removed and is in the form of a business indexing card 16 for insertion into a Rolodex, with relevant information such as contact names, phone numbers, instructions, etc. provided for easy future reference by the user. The card incorporates an indexing tab 17.

In alternative usages, the bottom section can have one- or two-sided printing with company slogans, song lyrics, directions for assembly, price schedules and similar information. The bottom may also have an attached booklet, be extended with accordion folds, incorporate a magnet for attachment to refrigerators, or provide reusable adhesive for sticking to surfaces after detachment from the base along perforations 14.

Figure 8:
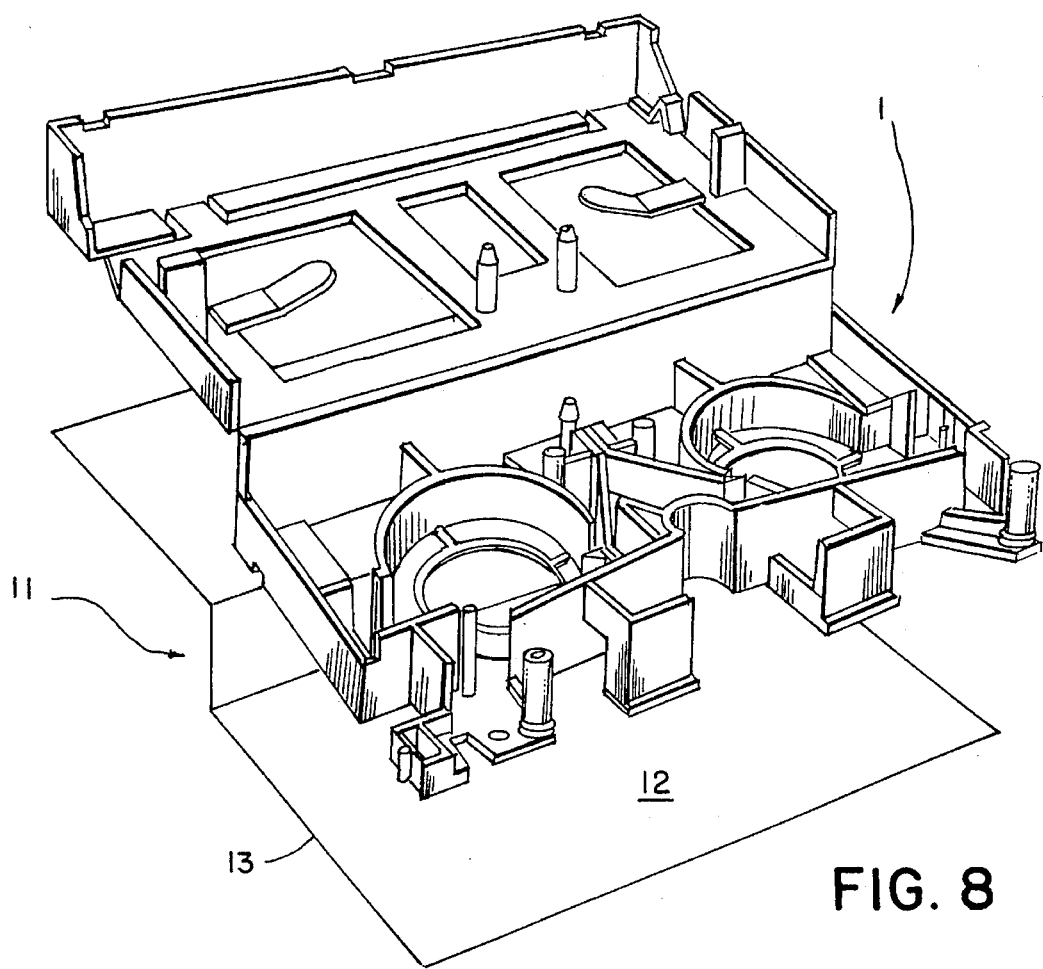
FIG. 8 is an elevated plan view of a preferred embodiment, having a solid lower card section with maximum display area.

FIG. 8 shows a preferred form of the card, having maximum display area. A booklet (not shown) can be provided on the interior side 12 of the section.

Figure 4:
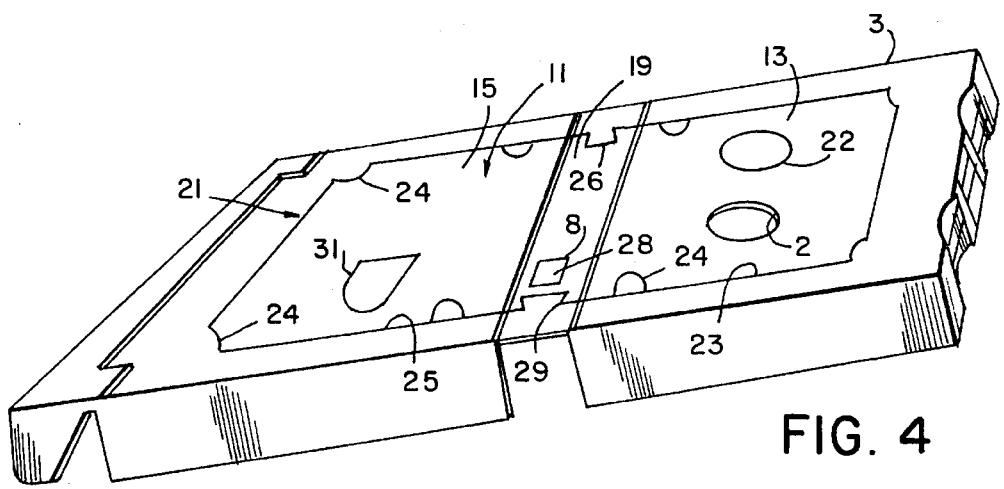
FIG. 4 is a developed view of the video cassette shown in FIG. 3.
Figure 5:
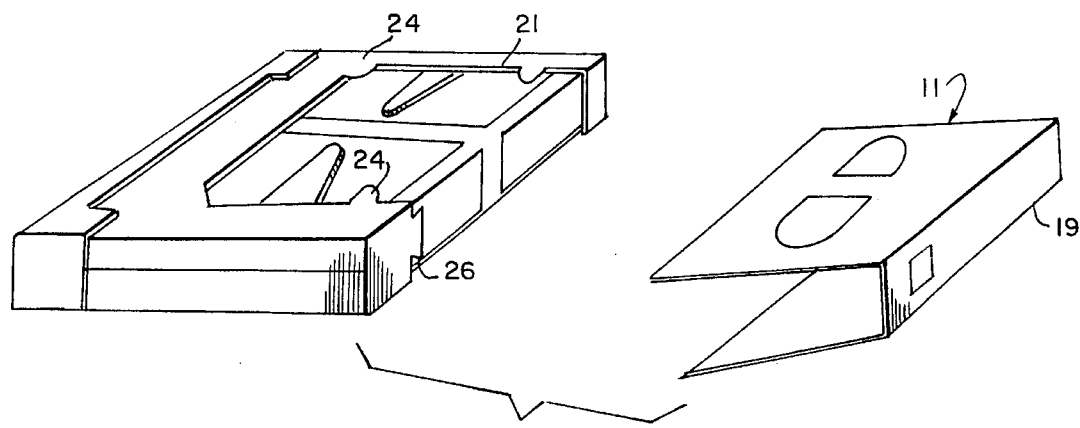
FIG. 5 shows a preferred method of inserting the graphics card.

In another form of the invention as shown in FIGS. 3, 4 and 5, a graphics card 11 has a lower portion 13, and upper portion 15 and a back portion 19. The graphics card 11 is inserted within a continuous recess 21, which has a back portion 23, and upper portion 25 and a rear portion 29. Retainers 24 extend inward from edges of the upper recess 25, and similar retainers 24 extend inward from edges of the lower recess 23. Openings 22 are formed in the lower portion 13 of the graphics card to provide access to the hub openings 2 in the base 3 of the video cassette. An opening 28 in the back portion 19 of the label aligns with opening 8 in the back 9 of the video cassette to permit entry of a sensor for preventing recording on a prerecorded tape. Retainers 26 extend along opposite sides of the recess 29 in the back to hold the graphics card label on the back 9 of the cassette 1.

A window 32 may be provided as a cutout in the label to observe the reel and tape and the amount of tape on a reel. Preferably the graphics card 11 is made of a thin heavy substantially rigid paper material, which slides under the retainers 24 and which may be flexed to slide under the retainers 26 in the back 9.

As shown in FIG. 3, the label 11 is folded into a U-shape for sliding beneath the retainers 24 in the channels 21.

Edges of the back portion 19 of the label are slightly resiliently deformed to fit under the label-capturing retainers 26.

Figure 6:
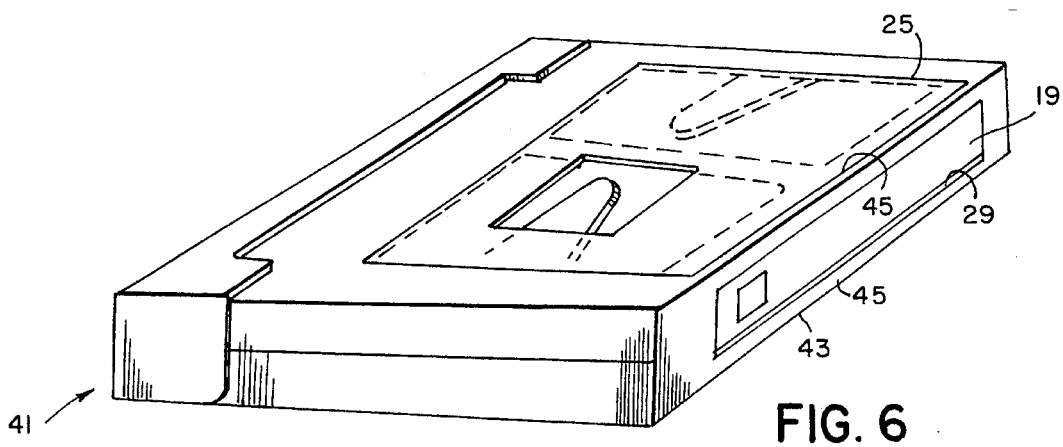
FIG. 6 is an alternate form of the invention.
Figure 7:
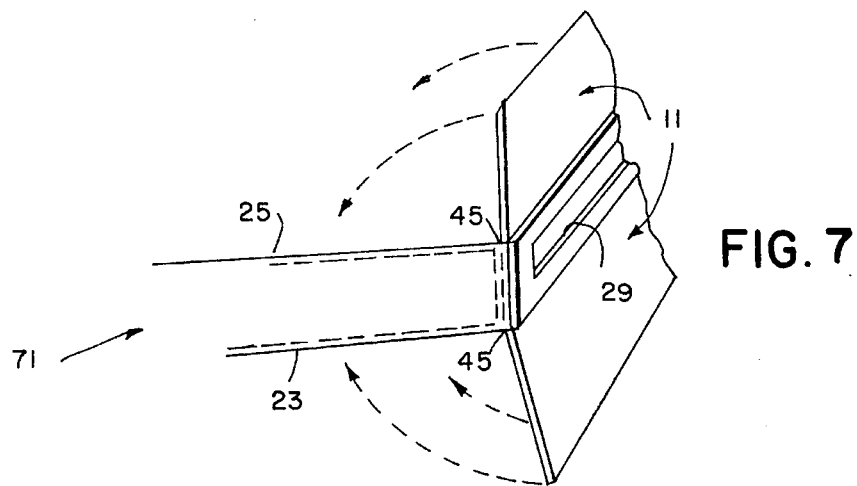
FIG. 7 is a detail of the insertion of the graphics card in the wrap around graphics form shown in FIG. 6.
Figure 9A:
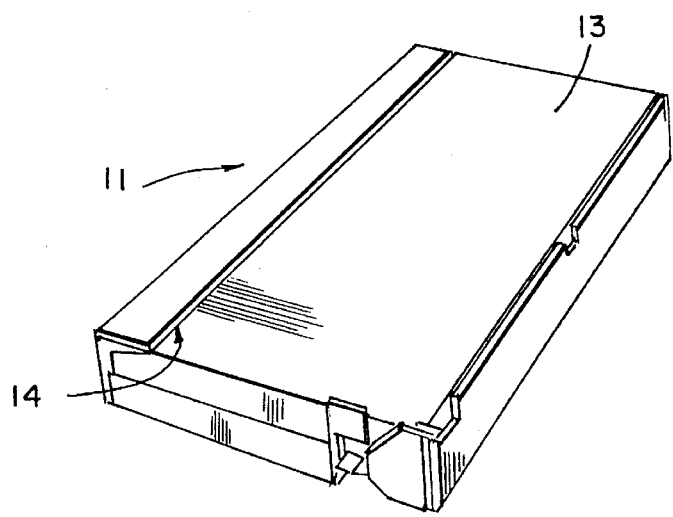

Cassette 41 shown in FIGS. 6 and 7 uses the same label 11 as shown in FIGS. 1–3. However, the cassette 41 is formed with two slats or strips 43, which have openings 45 between the recess 25 and the rear recess 29, and between the rear recess 29 and the lower recess 23. Card 11 is inserted through the openings 45 so that the back portion 19 of the label is aligned with the recess 29 in the back of the video cassette, then the upper portion 15 of the label is folded downward and the lower portion 13 of the label is folded upward to lie within the respective recesses 25 and 23. Edges of the labels are deformed and fitted under retainers similar to retainers 24 shown in FIG. 4. Alternatively, the inside of the label may be bonded to the cassette within the recesses 21. Similar bonding may be used in addition to retainers 24 and 26 in the embodiment shown in FIGS. 1–3. In that embodiment the retainers 26 may be replaced by adhesive bonding between the back portion 19 of the graphics card label 11 and the back 9 of cassette 1. FIGS. 9a, 9b and 9c are variations of the wrap-around label. In FIG. 9a, the label has a bottom 13 substantially the same size as the cassette. Perforations 14 across the face of the bottom allow detachment from the base of the cassette. FIGS. 9b and 9c show the attachment of the label to the cassette.

FIGS. 10, 11 and 12 disclose a preferred embodiment of the present wrap around label. The label 11 wraps around the cassette 1 and has at least three sections, the top 47, the front 49 and the bottom 51. The three sections provide increased display areas through covering most of the exterior of the cassettes, and a back section 53 can be added for increased display.

Proximal the junctures of the front 49 to the top 47 and bottom 51 sections, scores or perforations 55 are provided transversely for removal of the front from the cassette. The top, bottom and back sections are adhered to the cassette. Windows (not shown) can be provided on this embodiment as described previously.

As shown in FIG. 12, the label is a single sheet which is provided with folds and perforations at the appropriate places.

The removable front section provides a function undisclosed in any prior art, wherein the cassette and label combination may be mailed or handled without fear of damaging the movable dust cover or exposing the tape held underneath the cover. The front also allows for a tamper-proof function, wherein it is evident that the tape has been viewed or tampered with if the front section has been removed.

While the invention has been described with reference to specific embodiments, modifications and variations of the invention may be constructed without departing from the scope of the invention, which is defined in the following claims.

I claim:

1. A video cassette and label combination comprising a cassette having integrally formed base, back and cover portions, at least one of said portions having plural molded openings and further having plural hub openings formed in the base portion, a label having bottom, rear and upper sections for respective attachment to the base, back and cover portions of the cassette, the bottom section being detachable from the label along perforations between the rear and the bottom sections, for removal from the cassette.

2. The label combination of claim 1, further comprising the molded openings being windows molded into the cover portion, and the upper section of the label incorporating clear sections for viewing an interior.

3. The label combination of claim 2, wherein the clear sections comprise plastic film adhered to edges of a label window in the upper section of the label.

4. The label combination of claim 1, further comprising the bottom section of the label being formed as an index card with an index tab.

5. The label combination of claim 1, further comprising openings in the bottom section of the label corresponding to the hub openings in the cassette.

6. The label combination of claim 1, further comprising the bottom section having an attached informational booklet.

7. The label combination of claim 1, wherein the label further comprises the detachable bottom section being formed as an index card with a reference tab, and further comprising the bottom section having an attached informational booklet.

* * * * *